US008265365B2

(12) United States Patent
Panin

(10) Patent No.: US 8,265,365 B2
(45) Date of Patent: Sep. 11, 2012

(54) TIME OF FLIGHT SCATTER DISTRIBUTION ESTIMATION IN POSITRON EMISSION TOMOGRAPHY

(75) Inventor: Vladimir Y. Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 249 days.

(21) Appl. No.: 12/885,846

(22) Filed: Sep. 20, 2010

(65) Prior Publication Data
US 2012/0070050 A1 Mar. 22, 2012

(51) Int. Cl.
G06K 9/00 (2006.01)
(52) U.S. Cl. ........................................ 382/128; 382/154
(58) Field of Classification Search .................. 382/128, 382/154
See application file for complete search history.

(56) References Cited

U.S. PATENT DOCUMENTS

| 6,858,847 | B1   | 2/2005  | Macciocchi              |
|-----------|------|---------|-------------------------|
| 6,878,115 | B2 * | 4/2005  | Dione et al. ... 600/459 |
| 7,057,178 | B1 * | 6/2006  | Manjeshwar et al. ... 250/363.04 |
| 7,397,035 | B2 * | 7/2008  | Watson ... 250/363.07   |
| 7,465,927 | B2 * | 12/2008 | Panin et al. ... 250/363.03 |
| 7,848,559 | B2 * | 12/2010 | Defrise et al. ... 382/132 |
| 7,856,129 | B2 * | 12/2010 | Panin et al. ... 382/128 |
| 7,988,715 | B2 * | 8/2011  | Johansson et al. ... 607/88 |
| 8,000,513 | B2 * | 8/2011  | Defrise et al. ... 382/132 |

OTHER PUBLICATIONS

Watson, "New, faster, image-based scatter correction for 3D PET," IEEE Trans. Nucl. Sci., vol. 47, No. 4, pp. 1587, 1594, 2000.
Watson, "Extension of Single Scatter Simulation to Scatter Correction of Time-of-Flight PET," IEEE Trans. Nucl. Sci., vol. 54, No. 5, pp. 1679-1696, 2007.
Werner, et al., "Implementation and Evaluation of a 3D PET Single Scatter Simulation with TOF Modeling," IEEE Nuclear Society Symp. Conf. Rec., San Diego, CA 2006, vol. 3, pp. 1768-1773.
Nuyts, et al., "Reducing Loss of Image Quality Because of the Attenuation Artifact in Uncorrected PET Whole-Body Images," J. Nucl. Med., vol. 43, pp. 1054-1062, 2002.

* cited by examiner

Primary Examiner — Tom Y Lu
(74) Attorney, Agent, or Firm — Peter Kendall

(57) ABSTRACT

Estimating time-of-flight (TOF) scatter distribution in a positron emission tomography (PET) system. Obtaining PET TOF projection data: PET random coincidence data and PET TOF prompt coincidence events data. Reducing measured TOF projection data to non-TOF projection data. Reconstructing, unbiased, the non-TOF projection date. Forward projecting unbiased reconstructed non-TOF projection data to estimate TOF trues distribution. Subtracting: The estimated TOF trues distribution and the measured random coincidence, from measured TOF prompt coincidence events.

18 Claims, 8 Drawing Sheets

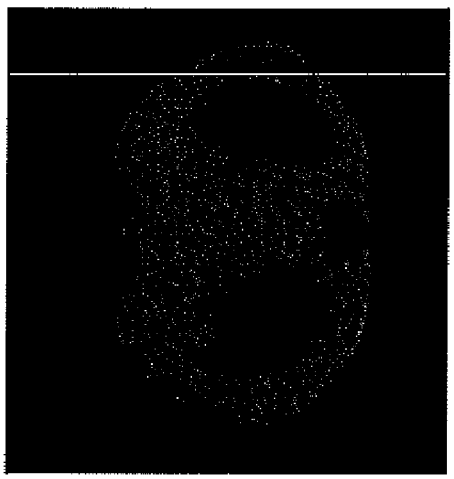
630
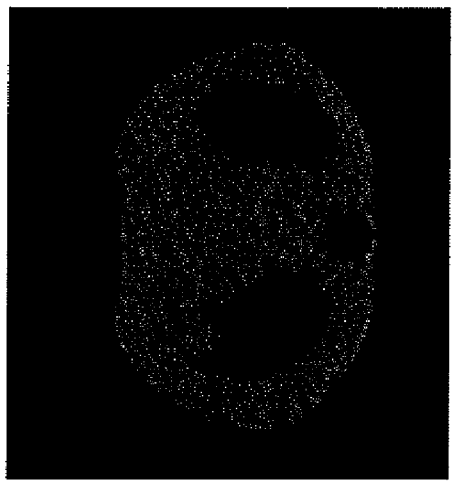
620
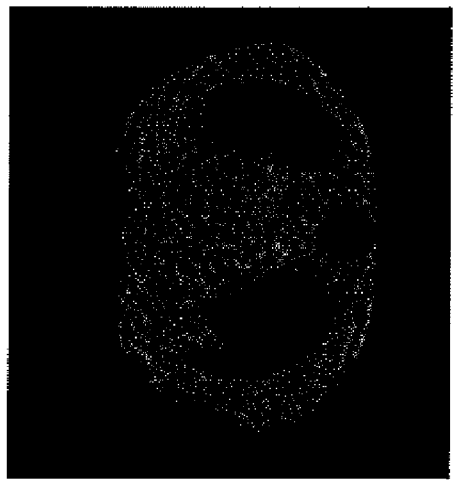
610
FIG. 6

TIME OF FLIGHT SCATTER DISTRIBUTION ESTIMATION IN POSITRON EMISSION TOMOGRAPHY

FIELD

The technology disclosed herein (the "technology") relates to time-of-flight (TOF) scatter distribution estimation in positron emission tomography (PET). More specifically, the technology relates to system, method, and computer program product implementations of the technology.

BRIEF DESCRIPTION OF THE DRAWINGS

Reference will now be made, by way of example, to the accompanying drawings which show example implementations of the present application.

FIG. 6 illustrates torso phantom reconstructions from low count data, including a reconstruction with the disclosed technology.

DETAILED DESCRIPTION

Figure 1:
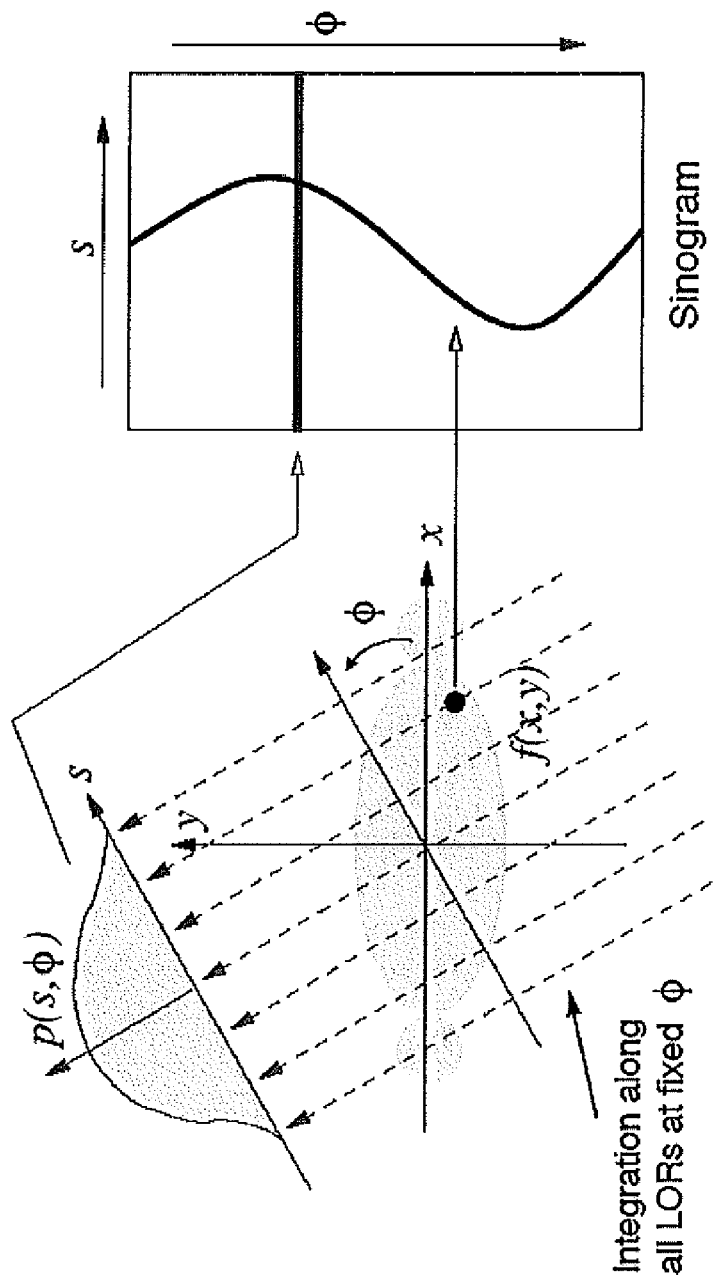
FIG. 1 illustrates derivation of a sinogram from lines of response.

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Nuclear medicine is a unique specialty wherein radiation can be used to acquire images that can show the function and anatomy of organs, bones or tissues of the body. The technique of acquiring nuclear medicine images entails first introducing radiopharmaceuticals into the body—either by injection or ingestion. These radiopharmaceuticals are attracted to specific organs, bones or tissues of interest. The exemplary organs, bones, or tissues are also more generally referred to herein using the term "objects". Upon arriving at their specified area of interest, the radiopharmaceuticals produce gamma photon emissions that emanate from the body that can be captured by a scintillation crystal. The interaction of the gamma photons with the scintillation crystal produces flashes of light which are referred to as "events." Events can be detected by an array of photo detectors (such as photomultiplier tubes) and their spatial locations or positions are then calculated and stored. In this way, an image of the organ or tissue under study can be created from detection of the distribution of the radioisotopes in the body.

One particular nuclear medicine imaging technique is known as positron emission tomography, or PET. PET can be used to produce images for diagnosing the biochemistry or physiology of a specific organ, tumor or other metabolically active site. The measurement of tissue concentration using a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors; i.e., the gamma photon emissions are detected virtually simultaneously by each detector. When two oppositely disposed gamma photons each strike an oppositely disposed detector to produce a time coincidence event, they also identify a line(s)-of-response (LOR) along which the annihilation event has occurred. An example of a PET method and apparatus is described in U.S. Pat. No. 6,858,847, which patent is incorporated herein by reference in its entirety.

After being sorted into parallel projections, the LOR defined by the coincidence events are used to reconstruct a three-dimensional distribution of the positron-emitting radio-nuclide within the patient. In two-dimensional PET, each 2D transverse section or "slice" of the radionuclide distribution is reconstructed independently of adjacent sections. In fully three-dimensional PET, the data are sorted into sets of LOR, where each set is parallel to a particular detector angle, and therefore represents a two dimensional parallel projection p(s, φ) of the three dimensional radionuclide distribution within the patient—where "s" corresponds to the distance of the LOR from the center of the detector and "φ" corresponds to the angle of the detector plane with respect to the x axis in (x, y) coordinate space (in other words, φ corresponds to a particular LOR direction).

Coincidence events are integrated or collected for each LOR and stored in a sinogram. In this format, a single fixed point in f(x, y) traces a sinusoid in the sinogram. In each sinogram, there is one row containing the LOR for a particular azimuthal angle φ; each such row corresponds to a one-dimensional parallel projection of the tracer distribution at a different coordinate along the scanner axis. This is shown conceptually in FIG. 1.

An event is registered if both crystals detect an annihilation photon within a coincidence time window τ (e.g., on the order of 4-5 nsec), depending on the timing properties of the scintillator and the field of view (FOV). The FOV is defined as the volume between the detectors; and a pair of detectors is sensitive only to coincidence events occurring in the FOV. Therefore, the need for physical collimation is eliminated and sensitivity is significantly increased. Accurate corrections (for example, attenuation correction) can be made for the self-absorption of photons within the patient so that accurate measurements of tracer concentration can be made.

The number of time coincidences detected per second within a FOV of a detector is the count rate of the detector. The count rate at each of two oppositely disposed detectors, A and B, can be referred to as singles counts or SA and SB, respectively. The time required for a gamma photon to travel from its point of origin to a point of detection is referred to as the time-of-flight (TOF) of the gamma photon. TOF is dependent upon the speed of light c and the distance traveled. A time coincidence or coincidence event is identified if the time difference between the arrivals of signals in a pair of oppositely disposed detectors is within the coincidence time window τ. In conventional PET, the coincidence detection time window τ is wide enough so that an annihilation event occurring anywhere within the object will produce annihilation gamma photons reaching their respective detectors within the coincidence window. Coincidence time windows of 4.5-12 nsec are common for conventional PET, and are largely determined by the time resolution capabilities of the detectors and electronics.

Figure 2:
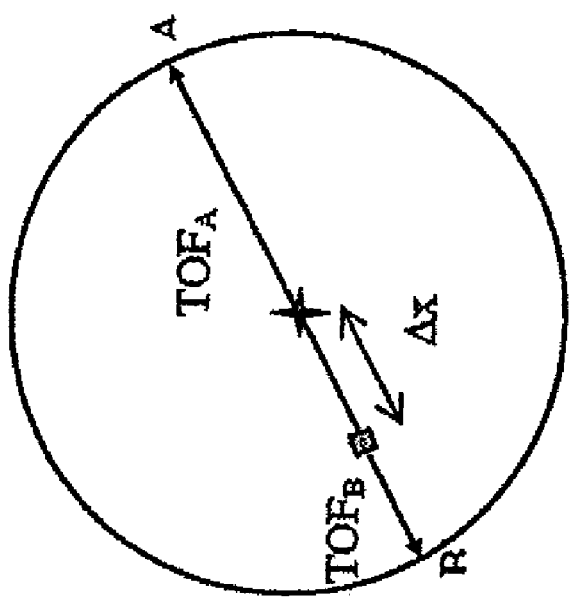
FIG. 2 illustrates time-of-flight (TOF) of an annihilation particle pair.

As illustrated in FIG. 2, if an annihilation event occurs at the midpoint of a LOR, the TOF of the gamma photon detected in detector A (TA) is equal to the TOF of the gamma photon detected in detector B (TB). If an annihilation event occurs at a distance Δx from the midpoint of the LOR, the difference between TA and TB is Δt=2Δx/c, where c is the speed of light. If d is the distance between detectors, the TOF difference Δt could take any value from −d/c to +d/c, depending on the location of the annihilation event.

Time-of-flight (TOF) positron emission tomography (PET) ("TOF-PET") is based on the measurement of the difference Δt between the detection times of the two gamma photons arising from the positron annihilation event. This measurement allows the annihilation event to be localized along the LOR with a resolution of about 75-120 mm full width half maximum ("FWHM"), assuming a time resolution of 500-800 ps (picoseconds). Though less accurate than the spatial resolution of the scanner, this approximate localization is effective in reducing the random coincidence rate and in improving both the stability of the reconstruction and the signal-to-noise ratio (SNR), especially when imaging large objects. Thus, in TOF-PET, the "TOF" coordinate, Δt, is stored together with s and ϕ.

The statistics of PET data are much worse than those obtained through transmission tomography, e.g., through Computer Tomography (CT). A typical PET data may have millions of counts for the whole acquisition, while an equivalent CT data set may contain a few billion counts. As such, PET data suffer from scatter and random events much more dramatically than CT data does. As a consequence, considerable processing of PET data is required, including correction for random coincidences, along with estimation and subtraction of scattered photons.

Advances have been reported in developing non-TOF single scatter simulations (SSS), which are now routinely used in PET to correct for scatter, by C. C. Watson in "New, faster, image-based scatter correction for 3D PET," IEEE Trans. Nucl. Sci., vol. 47, no. 4, pp. 1587, 1594, 2000. It was concluded that non-TOF distribution, uniformly distributed and properly scaled across TOF bins, does not serve well for TOF reconstruction. Subsequently, an extension single scatter estimation was developed for the TOF case to model the shape of the scatter distribution for each TOF bin, as reported by C. C. Watson in "Extension of Single Scatter Simulation to Scatter Correction of Time-of-Flight PET," IEEE Trans, Nucl. Sci., vol. 54, no. 5, pp. 1679-1696, 2007 and by M. E. Werner, S. Surti, J. S. Karp, "Implementation and Evaluation of a 3D PET Single Scatter Simulation with TOF Modeling," IEEE Nuclear Society Symp. Conf. Rec., San Diego, Calif. 2006, vol. 3, pp. 1768-1773. However, such simulation can be resource-intensive (requiring both memory and processor resources, and taking often-unacceptable time) and is challenging.

Non-TOF scatter estimation can be sufficient to estimate TOF scatter distribution through non-TOF image reconstruction. While it is commonly understood that one difference between TOF and non-TOF images is the image noise level, non-TOF image noise levels are not necessarily an issue in scatter estimation, since the distribution can be assumed to be smooth, Further, it can be useful for TOF scatter modeling to be based on non-TOF emission estimation given restricted computer resources at the preprocessing reconstruction stage. The present technology can avoid TOF modeling for scatter correction.

In some implementations of the technology, measured TOF projection data are reduced to non-TOF projection data by adding counts across TOF bins.

Unbiased reconstruction in a low activity region is advantageous for scatter estimation, which extends beyond true distribution in projection space. In implementations of the present technology a NEG-OSEM algorithm that allows for negative image voxel values can be used to perform unbiased non-TOF reconstruction on the non-TOF projection data. NEG-OSEM algorithms are described by J. Nuyts, S. Stroobants, P. Dupont, S. Vleugels, P. Flamen, and L. Mortelmans in "Reducing Loss of Image Quality Because of the Attenuation Artifact in Uncorrected PET Whole-Body Images," J. Nucl. Med., vol. 43, pp. 1054-1062, 2002. Such an algorithm converges quickly, e.g., after relatively few iterations, in low or zero activity regions.

Filtered Back Projection (FBP)+Fourier Rebinned (FORE) can be used as an alternative to NEG-OSEM for unbiased non-TOF reconstruction in the present technology. Though FBP+FORE is less preferred, since such reconstruction using FBP+FORE can produce streak artifacts in the direction of most of the attenuation. This in turn can produce artificial tails in the scatter estimation.

TOF forward projection of a non-TOF reconstructed image can be performed on the reconstructed non-TOF data. In this way, TOF trues distribution T can generated:

$$T_{i,t} = ACF_i^{-1} \sum_j C_{it,j} f_j \quad (1)$$

where ACF is the attenuation correction factor; f is the non-TOF reconstruction image voxel intensity; C is the fully 3D system matrix for the PET system; j is the image voxel index; i is the projection data bin including radial, azimuthal, and axial coordinates; and t is the TOF bin index.

Noisy scatter estimation S then can be obtained by:

$$S_{i,t} = N_i(P_{i,t} - R_i) - T_{i,t}, \quad (2)$$

where P is measured prompts, and R is measured randoms and N is the normalization factor used to account for the efficiency of detectors.

Noisy scatter estimation is further processed by smoothing filtering, based on a priori information that scatter is low frequency distribution.

Consider operation of the technology on data acquired in list mode format on the Siemens mCT scanner. An anthropomorphic torso phantom was used. The phantom includes a water-filled lower cavity to simulate the liver, two air-filled and Styrofoam-filled lung-shaped cavities, and a cylindrical spine-like insert. Two cylindrical water-filled containers were placed at the side of the phantom to represent the attenuation due to the arms of a patient, with no activity. Three hours of acquisition was used to verify image quality in a high count scan. A three minute acquisition, which was of typical patient scan count level, was also investigated.

The mCT sinogram consists of 400 (radial)×168 (azimuthal)×621 (axial)×13 (TOF) bins. Using standard non TOF scatter estimation, the non-TOF image was reconstructed by NEG-OP-OSEM with 3 iterations and 24 subsets. This image was TOF forward projected and noisy scatter estimation was obtained by equation (2). The following smoothing procedure was applied on this scatter sinogram. First, scatter sinogram underwent SSRB (Single Slice Rebinning) procedure. This way polar angle scatter independency was modeled. Second, the sinogram was downsampled to dimension 40×44×11×13, which is similar to standard SSS modeling. The boxcar average filter with width 3×3×3×3 was applied on this downsampled sinogram. Finally scatter sinogram was restored to original dimension by linear interpolation.

Figure 3:
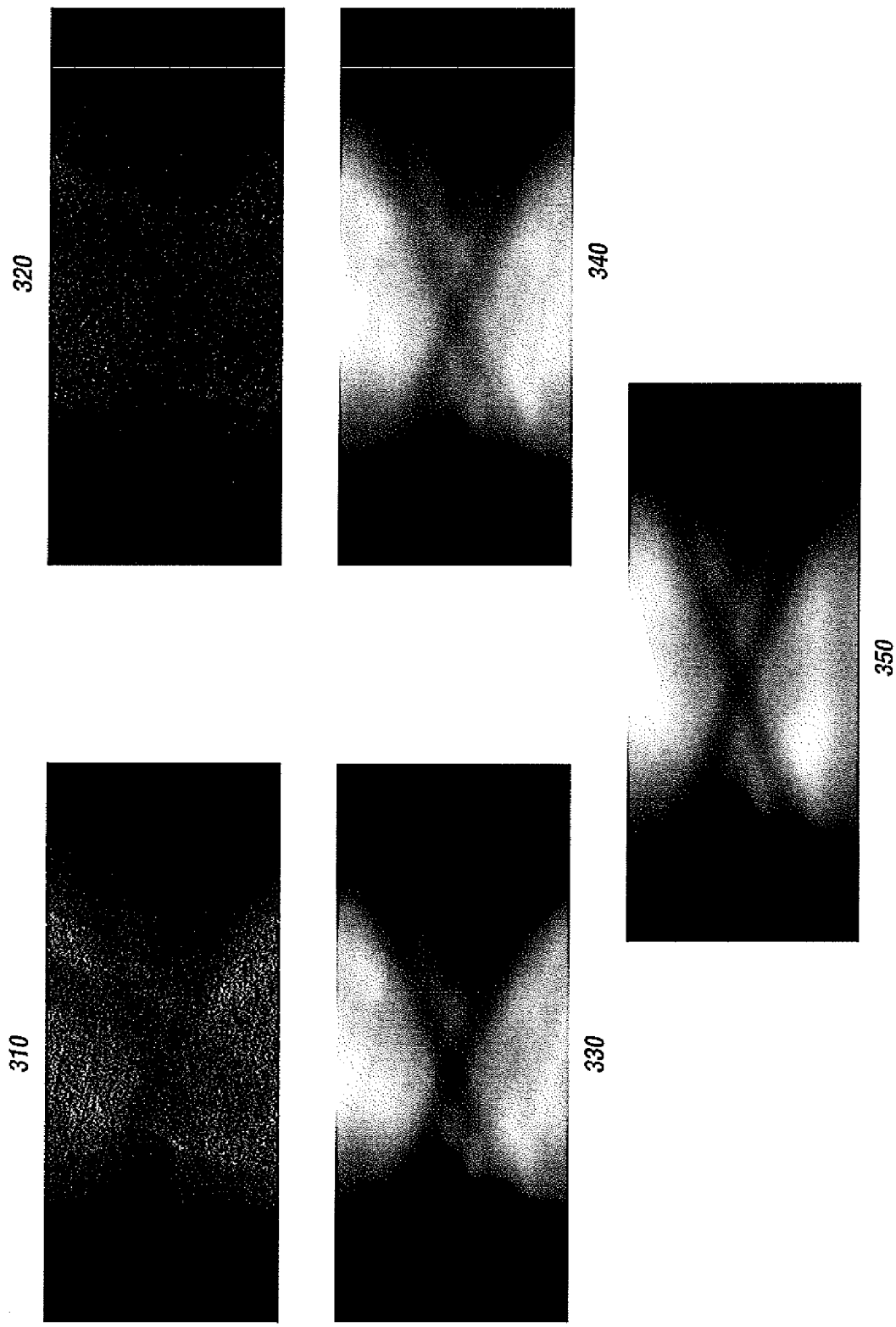
FIG. 3 compares a scatter estimation sinogram estimation by implementations of the present technology (top) and estimation by singles scatter simulation (bottom).

FIG. 3 shows the scatter estimation using the present technology (310, 330 from 3 hours of collection; 320, 340 from 3 minutes of collection), and by Siemens TOF SSS tool 350. Some deviations between the two technologies are evident in unsmoothed scatter estimation 310, 320 in the image border and lung footprint area in the projection. It was concluded that approximate non-TOF SSS can not exactly reproduce these regions. Nevertheless, such residuals disappeared in smoothed scatter estimation 330, 340 of the present technology. Note, that scatter estimation noise, evident in unsmoothed estimation 310, 320, was not issue in case of 3-minute scan due to significant smoothing amount usage. Negative values in final scatter estimation were replaced by zero value.

Figure 4:
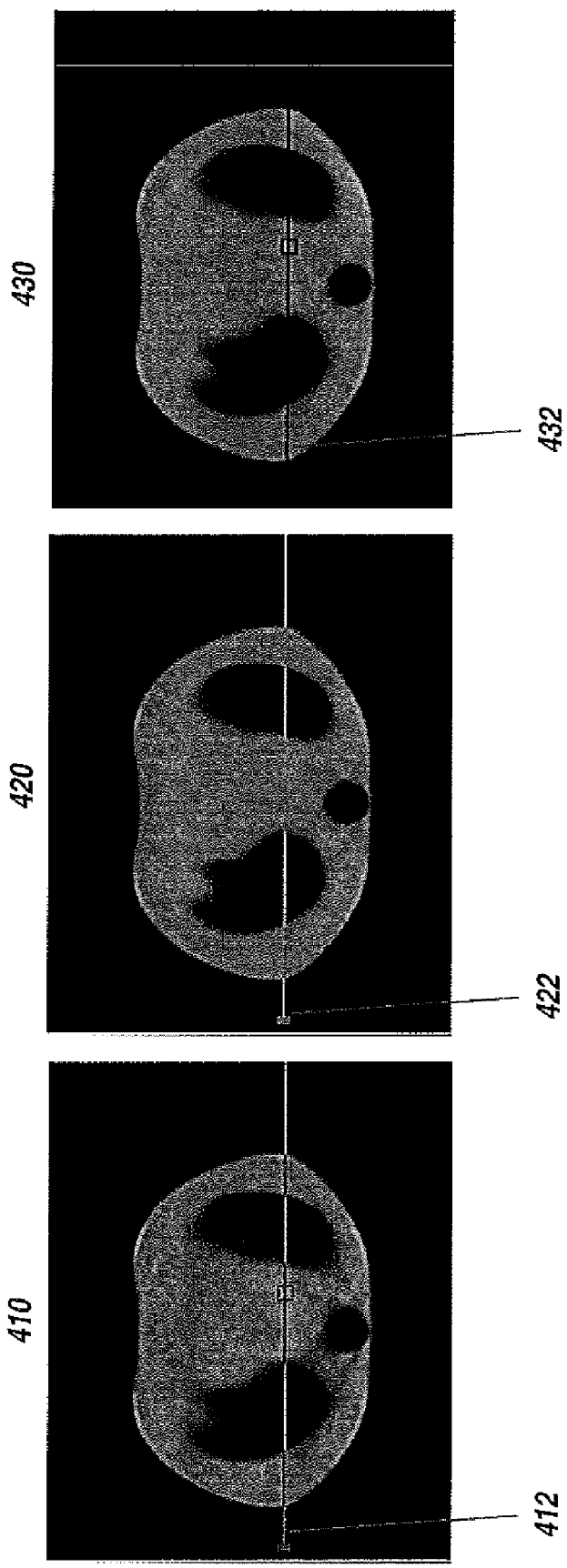
FIG. 4 illustrates torso phantom reconstructions, including a reconstruction with the disclosed technology.

The TOF sinogram was reconstructed using standard TOF scatter estimation and the estimation under investigation. FIG. 4 represents non-TOF and TOF reconstructions for high count case. Each of 410, 420, and 430 are from 3 hours of acquisition time. The non-TOF reconstruction 410 used 6 iterations, 12 subsets with standard non-TOF scatter estimation. The reconstruction of the present technology for scatter estimation 420 used 3 iterations, 12 subsets. The TOF reconstruction using known TOF scatter estimation 430 involved 3 iterations and 12 subsets. Each reconstruction shown in FIG. 4 used OSEM.

Figure 5:
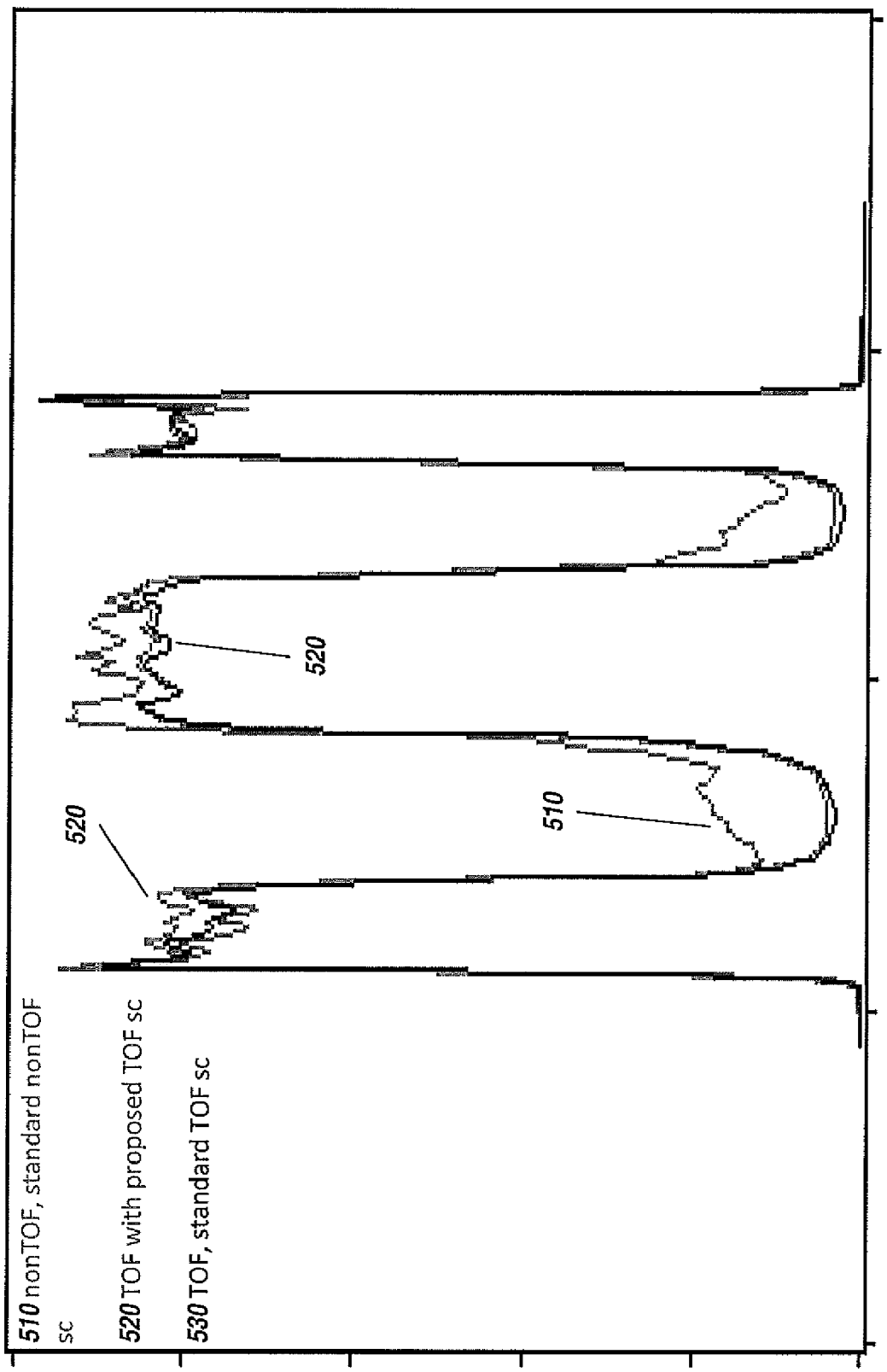
FIG. 5 illustrates the voxel intensity profile through the images of FIG. 4.

As illustrated in FIG. 5, showing voxel intensity 510, 520, and 530 along lines 412, 422, and 432 from FIG. 4 respectively, the proposed scatter estimation correction resulted in image quality similar to that of the standard TOF processing. This is despite the fact that non-TOF image sometimes showed non-uniformity across the image due to scatter estimation, as highlighted by the profile in FIG. 5.

TOF reconstruction better overcomes inconsistency in scatter correction, as was reported earlier by M. E. Werner, S. Surti, J. S. Karp, "Implementation and Evaluation of a 3D PET Single Scatter Simulation with TOF Modeling," IEEE Nuclear Society Symp. Conf. Rec., San Diego, Calif. 2006, vol. 3, pp. 1768-1773. In case of investigated phantom, such inconsistency is likely resulted from incorrect cylindrical spine-like insert attenuation value transformation from CT to 511 keV photon energy.

FIG. 6 displays reconstructions 610, 620, 630 in case of low count, 3-minute acquisition (corresponding to reconstructions 410, 420, 430 of FIG. 4). TOF images have advantage over non TOF image in noise property. The present technology did not result in additional noise in TOF reconstruction, comparing with standard processing.

Figure 7:
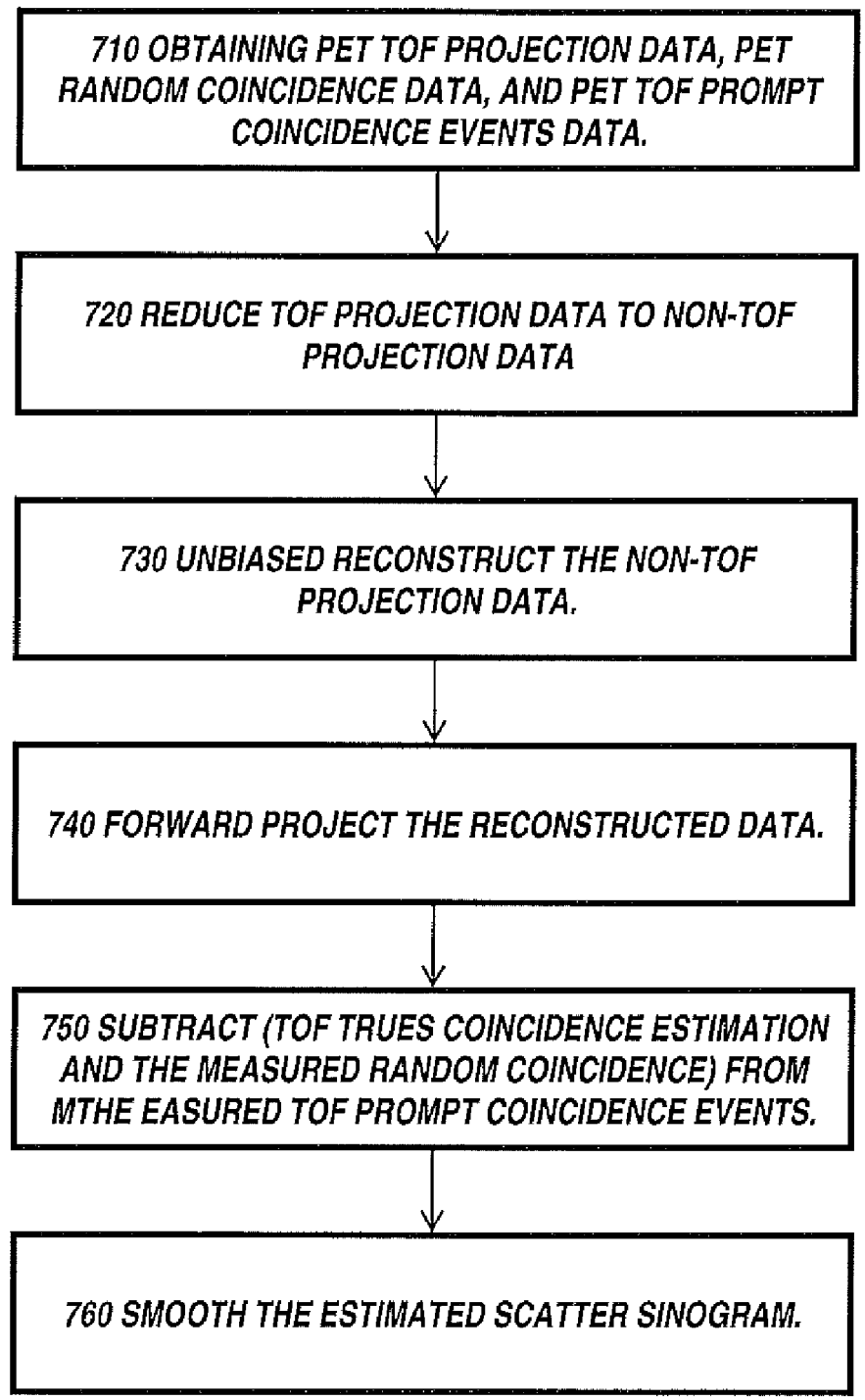
FIG. 7 illustrates computer-implemented methods of the technology.

Implementations of the technology comprise systems, computer-implemented methods, and computer program products for estimating TOF scatter distribution in a positron emission tomography (PET) system. Referring to FIG. 7, methods 700 of the technology are illustrated. In some methods, the technology starts with obtaining 710 PET TOF projection data, PET random coincidence data, and PET TOF prompt coincidence events data—either by receiving the data from an external entity or by measuring the data. The TOF projection data can be reduced 720 to non-TOF projection data, e.g., by adding counts across bins. The non-TOF projection data can be unbiased reconstructed 730, and then forward projected 740 to estimate TOF trues distribution. The estimated TOF trues distribution and the measured random coincidence are subtracted 750, from measured TOF prompt coincidence events. The estimated scatter sinogram is then smoothed 760 to reduce noise, inherited from projections.

In some implementations of the technology unbiased reconstructing is by NEG-OSEM. In some implementations of the technology unbiased reconstructing is by Filtered Back Projection (FBP)+Fourier Rebinned (FORE).

The present technology can take the forms of hardware, software or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

Figure 8:
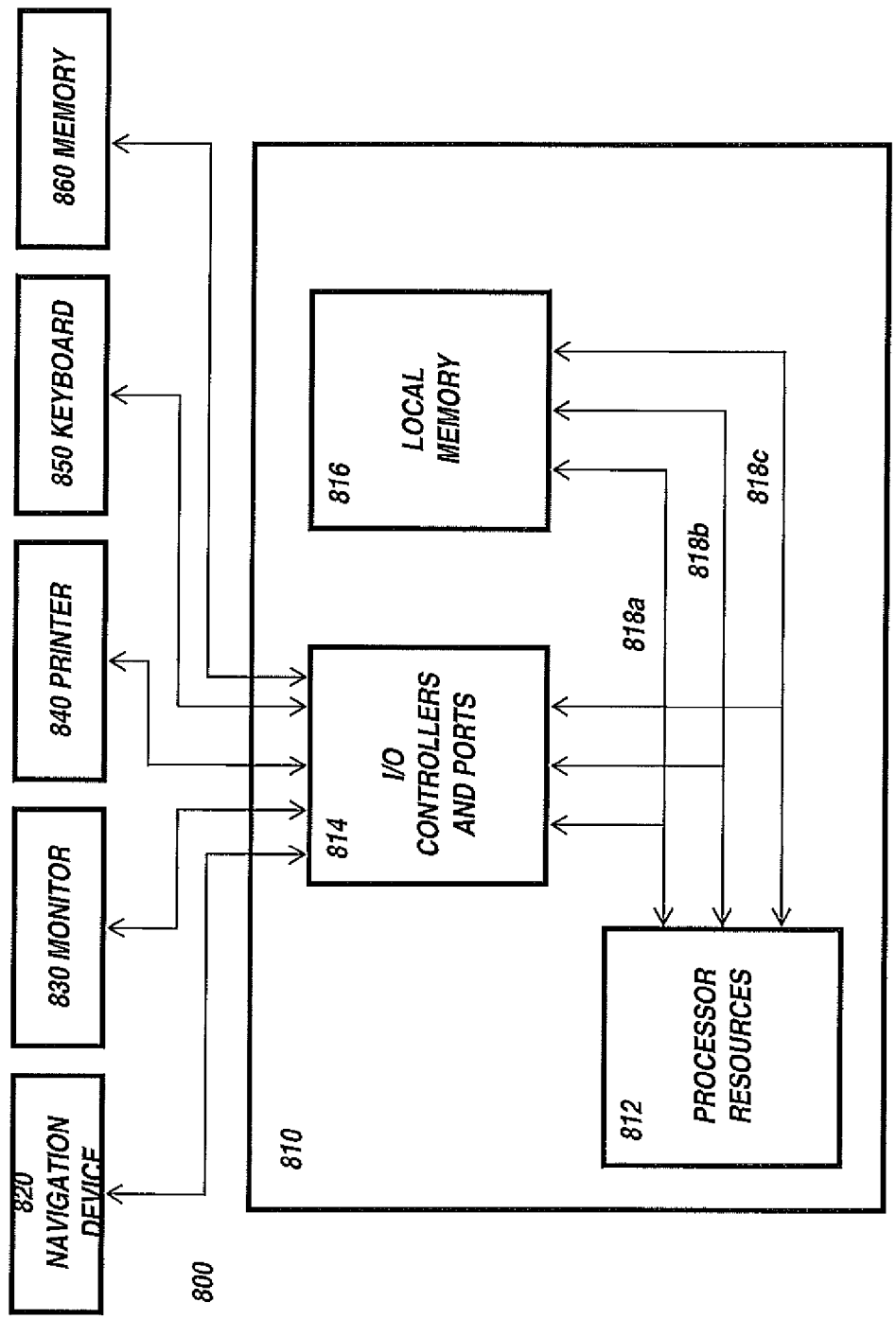
FIG. 8 illustrated a data processing system in which the technology can operate.

Referring to FIG. 8, a data processing system (e.g., 800) suitable for storing a computer program product of the present technology and for executing the program code of the computer program product can include at least one processor (e.g., processor resources 812) coupled directly or indirectly to memory elements through a system bus (e.g., 818 comprising data bus 818*a*, address bus 818*b*, and control bus 818*c*). The memory elements can include local memory (e.g., 816) employed during actual execution of the program code, bulk storage (e.g., 860), and cache memories (e.g., including cache memory as part of local memory or integrated into processor resources) that provide temporary storage of at least some program code in order to reduce the number of times code must be retrieved from bulk storage during execution. Input/output or I/O devices (including but not limited to keyboards 850, displays 830, pointing devices 820, etc.) can be coupled to the system either directly or through intervening I/O controllers (e.g., 814). Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A computer-implemented method for estimating time-of-flight (TOF) scatter distribution in a positron emission tomography (PET) system, the method comprising:
   obtaining PET TOF projection data: PET random coincidence data and PET TOF prompt coincidence events data;
   reducing measured TOF projection data to non-TOF projection data;
   reconstructing, unbiased, the non-TOF projection data;
   forward projecting unbiased reconstructed non-TOF projection data to estimate TOF trues distribution; and
   subtracting:
      the estimated TOF trues distribution and the measured random coincidence, from measured TOF prompt coincidence events.

2. The computer-implemented method of claim 1 wherein TOF trues distribution comprises:

$$T_{i,t} = ACF_i^{-1} \sum_j C_{it,j} f_j$$

where:
   ACF is the attenuation correction factor;
   f is the non-TOF reconstruction image voxel intensity;
   C is the fully 3D system matrix for the PET system;
   j is the image voxel index;
   i is the projection data bin including radial, azimuthal, and axial coordinates; and
   t is the TOF bin index.

3. The computer-implemented method of claim 1 wherein:
   the TOF projection data, the random coincidence data, and the TOF prompt coincidence events data are obtained through measurement.

4. The computer-implemented method of claim 1 wherein:
   reducing measured TOF projection data to non-TOF projection data further comprises:
      adding counts across TOF bins.

5. The computer-implemented method of claim 1 wherein: unbiased reconstructing is by NEG-OSEM.

6. The computer-implemented method of claim 1 wherein: unbiased reconstructing is by Filtered Back Projection (FBP)+Fourier Rebinned (FORE).

7. A computer program product for estimating time-of-flight (TOF) scatter distribution in a positron emission tomography (PET) system, the computer program product comprising:
   a least one computer readable medium; and
   at least one program module,
      stored on the at least one medium, and
      operative, upon execution by at least one processor for:
         obtaining PET TOF projection data: PET random coincidence data and PET TOF prompt coincidence events data;
         reducing measured TOF projection data to non-TOF projection data;
         reconstructing, unbiased, the non-TOF projection data;
         forward projecting unbiased reconstructed non-TOF projection data to estimate TOF trues distribution; and
         subtracting:
            the estimated TOF trues distribution and the measured random coincidence, from measured TOF prompt coincidence events.

8. The computer-implemented method of claim 7 wherein TOF trues distribution comprises:

$$T_{i,t} = ACF_i^{-1} \sum_j C_{it,j} f_j$$

where:
   ACF is the attenuation correction factor;
   f is the non-TOF reconstruction image voxel intensity;
   C is the fully 3D system matrix for the PET system;
   j is the image voxel index;
   i is the projection data bin including radial, azimuthal, and axial coordinates; and
   t is the TOF bin index.

9. The computer program product of claim 7 wherein:
   the TOF projection data, the random coincidence data, and the TOF prompt coincidence events data are obtained through measurement.

10. The computer program product of claim 7 wherein:
    reducing measured TOF projection data to non-TOF projection data further comprises:
       adding counts across TOF bins.

11. The computer program product of claim 7 wherein: unbiased reconstructing is by NEG-OSEM.

12. The computer program product of claim 7 wherein: unbiased reconstructing is by Filtered Back Projection (FBP)+Fourier Rebinned (FORE).

13. A system for estimating time-of-flight (TOF) scatter distribution in a positron emission tomography (PET) system, the system comprising:
    at least one processor,
    at least one computer readable medium in communication with the processor;
    at least one program module,
       stored on the at least one medium, and operative upon execution by the processor for:
          obtaining PET TOF projection data: PET random coincidence data and PET TOF prompt coincidence events data;
          reducing measured TOF projection data to non-TOF projection data;
          reconstructing, unbiased, the non-TOF projection data;
          forward projecting unbiased reconstructed non-TOF projection data to estimate TOF trues distribution; and
          subtracting:
             the estimated TOF trues distribution and the measured random coincidence, from measured TOF prompt coincidence events.

14. The system of claim 13 wherein TOF trues distribution comprises:

$$T_{i,t} = ACF_i^{-1} \sum_j C_{it,j} f_j$$

where:
ACF is the attenuation correction factor;
f is the non-TOF reconstruction image voxel intensity;
C is the fully 3D system matrix for the PET system;
j is the image voxel index;
i is the projection data bin including radial, azimuthal, and axial coordinates; and
t is the TOF bin index.

15. The system of claim 13 wherein:
the TOF projection data, the random coincidence data, and the TOF prompt coincidence events data are obtained through measurement.

16. The system of claim 13 wherein:
reducing measured TOF projection data to non-TOF projection data further comprises:
adding counts across TOF bins.

17. The system of claim 13 wherein:
unbiased reconstructing is by NEG-OSEM.

18. The system of claim 13 wherein:
unbiased reconstructing is by Filtered Back Projection (FBP)+Fourier Rebinned (FORE).

* * * * *